US005977901A

United States Patent [19]

Fenner

[11] Patent Number: 5,977,901

[45] Date of Patent: Nov. 2, 1999

[54] REMOTE CONTROL UNIT WITH BACKLIT FUNCTION INDICATOR

[75] Inventor: Knut T. Fenner, New York, N.Y.

[73] Assignees: Sony Corporation, Tokyo, Japan; Sony Corporation of America, Park Ridge, N.J.

[21] Appl. No.: 08/762,613

[22] Filed: Dec. 9, 1996

[51] Int. Cl.[6] .......... H04Q 1/00

[52] U.S. Cl. .......... 341/176; 341/20; 340/825.72; 362/26; 200/314

[58] Field of Search .......... 341/176, 20; 362/109, 362/26, 86; 200/310, 313, 318; 340/825.72

[56] References Cited

U.S. PATENT DOCUMENTS

| | | | |
|---|---|---|---|
| 4,124,879 | 11/1978 | Schoemer | 362/26 |
| 4,772,769 | 9/1988 | Shumate | 200/314 |
| 5,205,637 | 4/1993 | Caspari | 362/109 |
| 5,471,023 | 11/1995 | Kaizu | 200/310 |
| 5,537,300 | 7/1996 | Kraines | 362/86 |
| 5,568,367 | 10/1996 | Park | 362/109 |
| 5,644,303 | 7/1997 | Gioscia | 340/825.72 |

*Primary Examiner*—Michael Horabik
*Assistant Examiner*—Albert K. Wong
*Attorney, Agent, or Firm*—Jay H. Maioli

[57] ABSTRACT

A remote control including a plurality of function indicators made of a semitransparent material that allow light to pass through, a light source, and a light pipe placed behind the function indicators, the structural combination allowing the remote control to be operated in a darkened room. The structural combination is a layered arrangement of a printed circuit board that includes a group of light-emitting-diodes functioning as the light source, a number of function indicators arranged in one flexible layer, and a light pipe which is sandwiched between the printed circuit board and the layer of function indicators. The light pipe is made of transparent plastic and includes a group of bevelled recesses to receive the group of light-emitting-diodes, thereby distributing the light emitted by the light-emitting-diodes uniformly.

10 Claims, 6 Drawing Sheets

REMOTE CONTROL UNIT WITH BACKLIT FUNCTION INDICATOR

BACKGROUND OF THE INVENTION

This invention relates generally to remote control units for electronic appliances and, more particularly, to remote control units having some form of self-illumination.

Remote control units are used with a variety of electronic appliances, including compact disk players, tuners, and television systems.

Television screens are becoming larger, and "home theater" systems are now common around the country. To simulate a movie theatre experience at home, televisions are often used in darkened rooms where the remote control function indicators cannot be clearly seen. This darkened environment requires the TV viewer to turn the lights on to adjust the TV set or other devices, thereby reducing the quality of the TV viewing experience.

OBJECTS AND SUMMARY OF THE INVENTION

It is, therefore, an object of the present invention to provide a remote control unit that can be easily operated in a darkened room.

It is another object of the present invention to provide a remote control unit with backlit function indicator keys that can be seen and easily operated in a darkened room.

In accordance with one aspect of the present invention a remote control unit has semi-transparent or translucent rubber operating keys or buttons that are lit from behind, so that the labels placed on the respective operating keys can be seen and operated in a darkened room.

In accordance with another aspect, the present invention provides a light pipe, installed behind the function indicators or keys, formed of a transparent material for uniformly distributing the light emitted by a reduced number of light emitting diodes, thereby providing uniform key illumination with lowered battery power.

In accordance with another aspect, the present invention provides a slide switch including an opaque overlapping member that overlaps a static function indicator having a plurality of positions corresponding to a plurality of selectable functions and being formed of translucent rubber that is lit from behind, wherein the opaque overlapping member obscures the selected one of said plurality of functions and the selected functions can be determined in the dark.

These and other objects, advantages, and features of the present invention will become apparent to those skilled in the art upon consideration of the following description of the present invention.

DETAILED DESCRIPTION OF THE INVENTION

Figure 1:
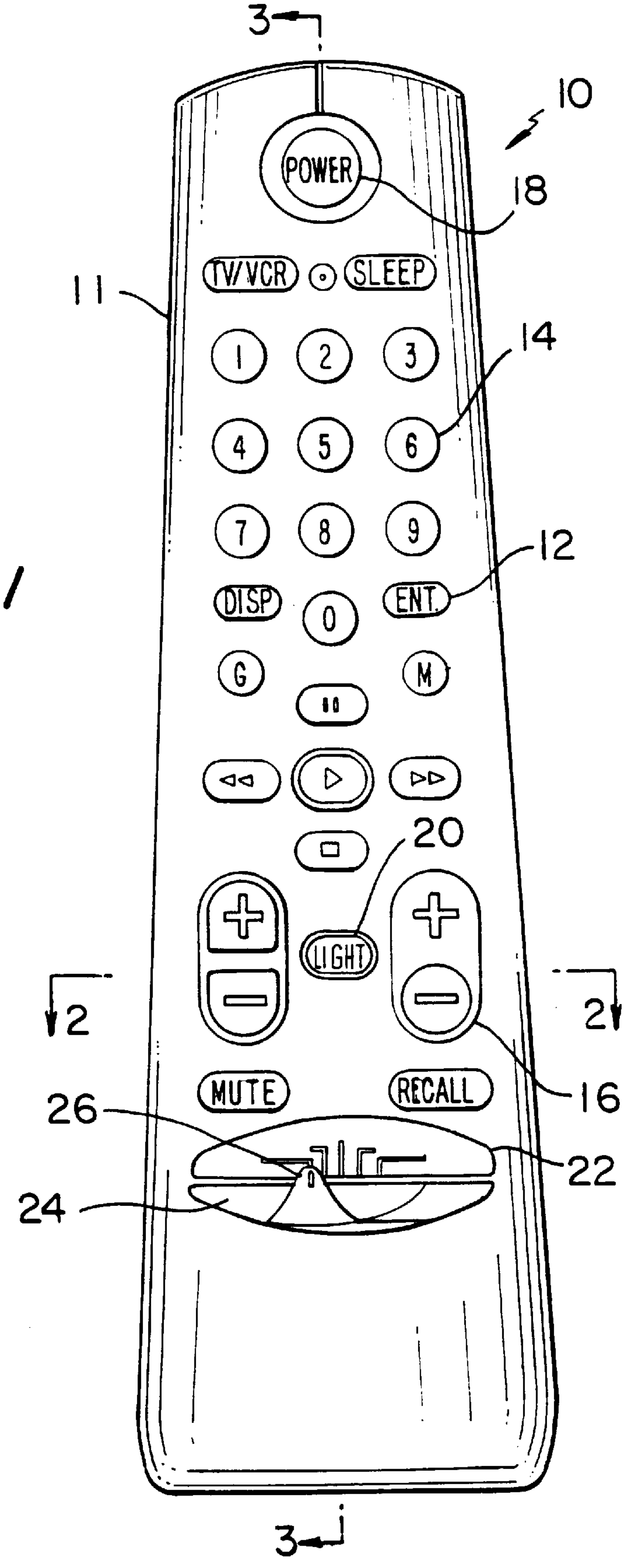
FIG. 1 is a front view of the remote control according to an embodiment of the present invention.

While this invention is susceptible of embodiment in many different forms, there is shown in the drawings and will herein be described in detail a specific embodiment, with the understanding that the present disclosure is to be considered as an example of the principles of the invention and is not intended to limit the invention to the specific embodiments shown and described. In the description below, like reference numerals are used to describe the same, similar or corresponding parts in the several views of the drawing.

Turning now to FIG. 1, a remote control unit 10 according to an embodiment of the present invention has a case 11 including several function and operation selectors of the push button type shown typically at 12, 14, 16, 18, and 20. Also, a static function indicator 22 with a corresponding slide switch 24 including an opaque overlapping slide switch member 26 is placed toward the bottom of the remote control unit 10. Labels or indicia describing the functions of the function indicators are placed on top of each one as shown in FIG. 1.

The push button 20 functions as a light switch. When key 20 is pressed, all function indicators 12, 14, 16, 18 light up and stay lit for approximately ten seconds or for as long as any of the several other function indicator is operated, thereby allowing the remote control to be operated in a darkened room. To reduce battery consumption, approximately ten seconds after the user finishes operating any of the function indicators 12, 14, 16, 18, 20 the light is automatically turned off.

Figure 4:
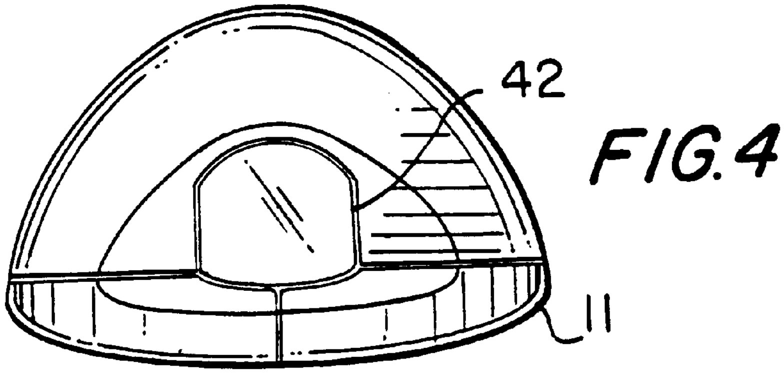
FIG. 4 is a bottom view of an embodiment of the present invention.
Figure 5:
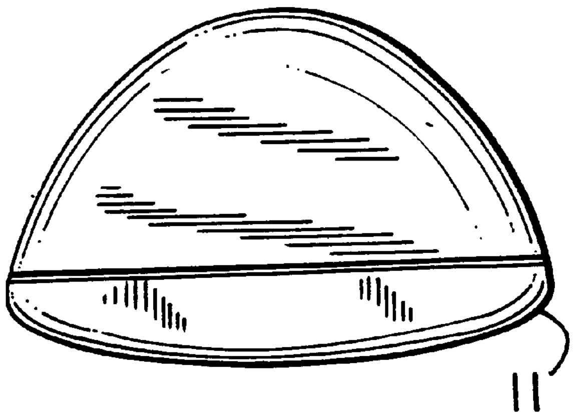
FIG. 5 is a top view of an embodiment of the present invention.

The case 11 has a base with a large footprint as shown in FIG. 4, thereby allowing the remote control to remain standing when placed in this position on a table. Further, the case 11 is designed with a low center of gravity by making its top, shown in FIG. 5, narrower than its bottom footprint, and by placing the battery compartment 34, including a pair of batteries 98 (not shown), closer to the bottom as shown in FIG. 3.

Figure 3:
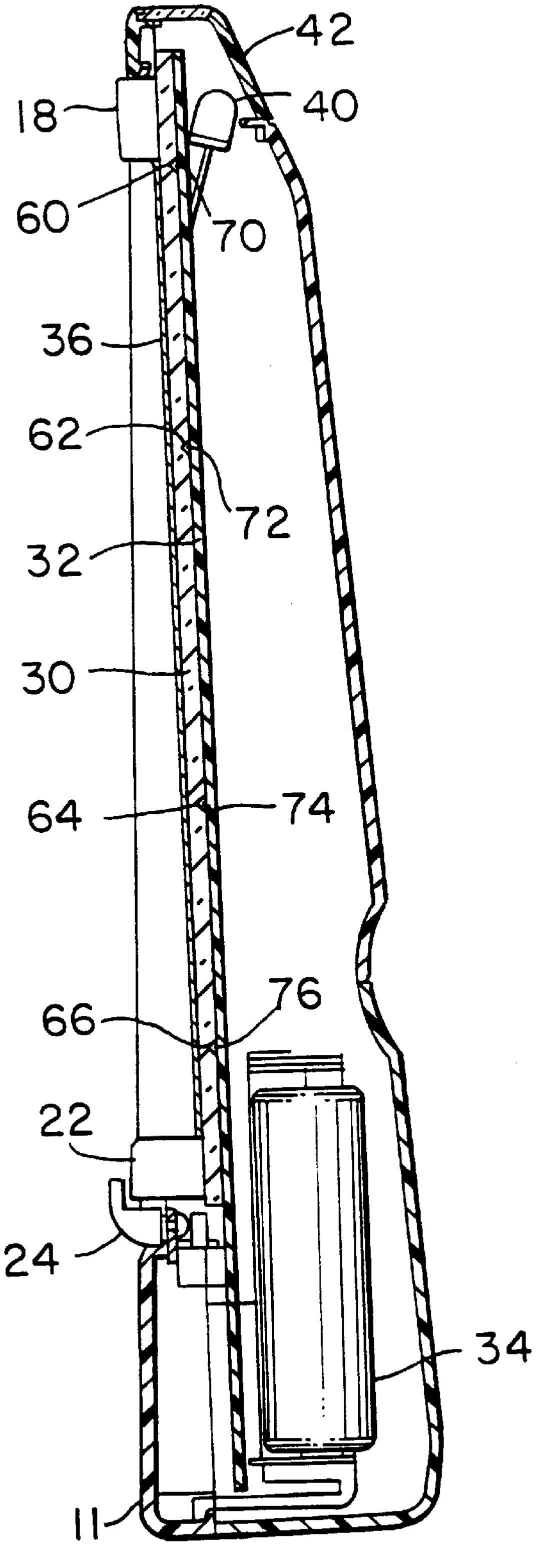
FIG. 3 is another cross-sectional view taken along section lines 3—3 in FIG. 1 of an embodiment of the present invention.

The commands and numbers entered via the function indicators 12, 14, 16, 18 are transmitted to the electronic appliance under control via coded radiation from an infrared light-emitting-diode ("IR LED") 40 passing through a filter 42, as shown in FIG. 3.

Figure 2:
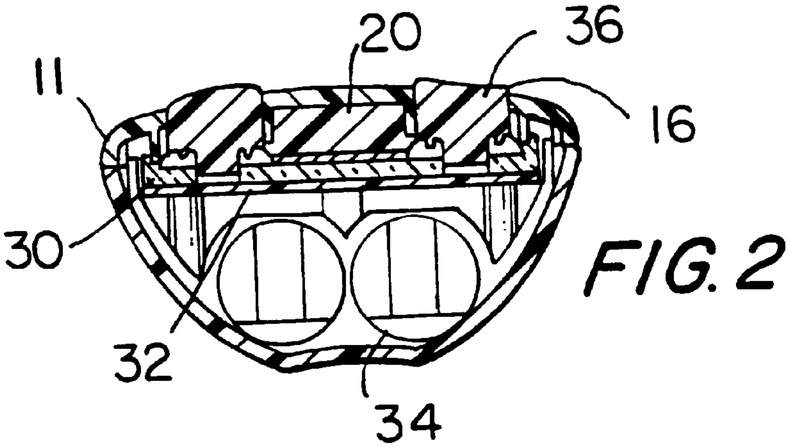
FIG. 2 is a cross-sectional view taken along section lines 2—2 in FIG. 1 showing the function indicators according to an embodiment of the present invention.

Turning now to the cross-sectional views of FIG. 2 and FIG. 3, the layered arrangement, according to an embodiment of the present invention, of a printed circuit board ("PCB") 32, a light pipe 30, and a function indicator or keyboard layer 36 will be described.

The function indicators are formed in one layer of semi-transparent or translucent rubber 36 that allows light to pass through. The cross-sectional view of the function indicators 16 and 20 shown in FIG. 2 would be similar for all other function indicators 12, 14, 16, 18, 20 disposed on the case 11. The cross-sectional view in FIG. 3 is taken through an off-set section line so as to show only two function indicators 18 and 22 for clarity. The function indicator layer 36 fits on the outside surface of the light pipe 30.

The PCB 32 includes four light-emitting-diodes ("LEDs") mounted at locations 70, 72, 74, and 76. The light pipe 30, which is sandwiched between the PCB 32 and the function indicator layer 36, includes recesses 60, 62, 64, and 66 to receive the body of the corresponding LEDs. This configuration allows the light emitted by the LEDs 70, 72, 74, and 76 to be evenly distributed by the light pipe 30.

Figure 6:
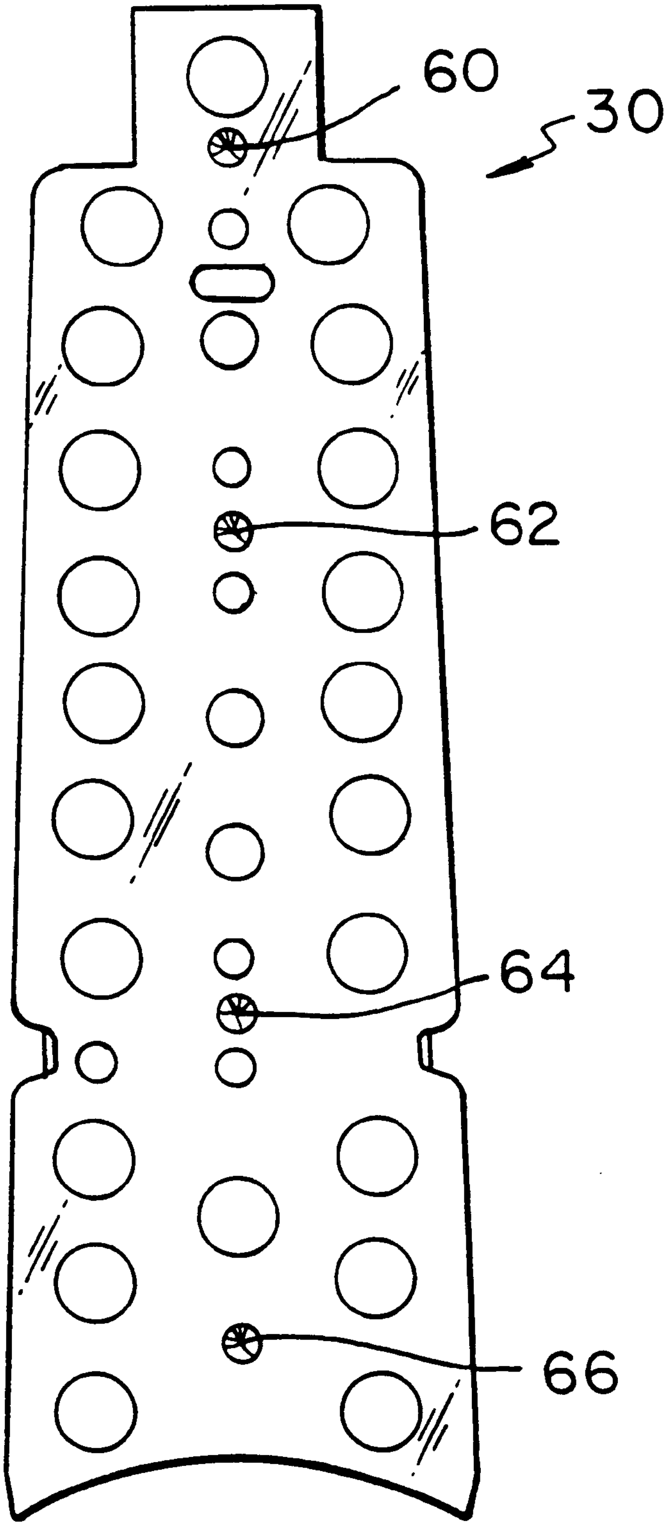
FIG. 6 is a front view of the light pipe according to an embodiment of the present invention.

FIG. 6 shows a front view of the light pipe 30 showing the bevelled recesses 60, 62, 64, and 66. The light pipe 30 is made of transparent plastic and can be injection molded according to an embodiment of the present invention.

Figure 7:
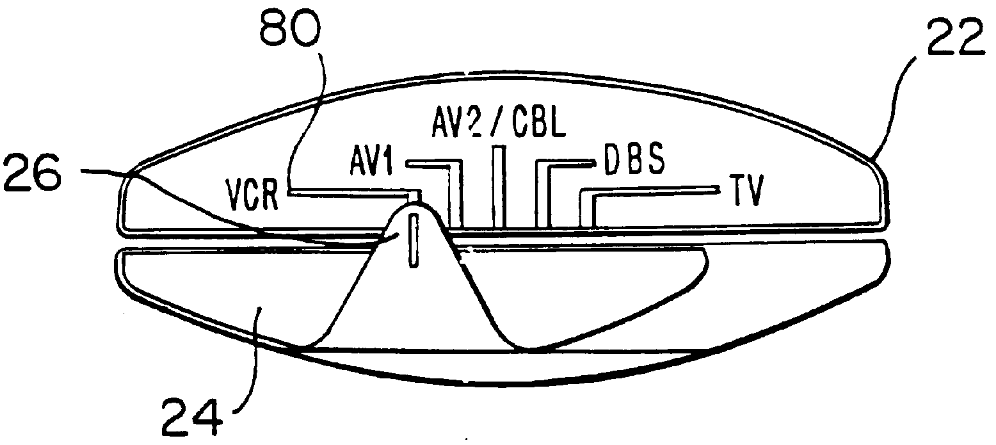
FIG. 7 is an enlarged view showing a detail of the slide switch and corresponding function indicator.
Figure 8:
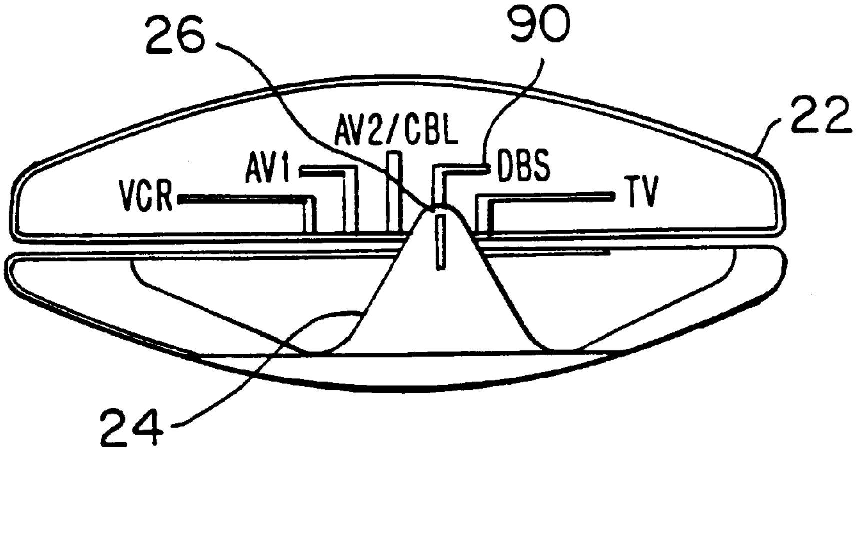
FIG. 8 is another enlarged view showing a detail of the slide switch and corresponding function indicator.

Turning now to FIG. 7 and FIG. 8, the function of the static function indicator 22 with its corresponding slide switch 24 will be described. The slide switch 24 has an opaque overlapping slide switch member 26 that overlaps the static function indicator 22. The static function indicator 22 according to this embodiment has five positions labeled VCR, AV1, AV2/CBL, DBS, and TV. One of these five functions can be selected by sliding the slide switch 24 in the left to right direction, as shown in FIGS. 7 and 8. Since the static function indicator 22 is backlit, when the slide switch 24 is moved, for example, from the VCR position as shown in FIG. 7 to the DBS position shown in FIG. 8, the overlapping slide switch member 26 obscures the area below the function label, thereby giving the user a clear indication of the function that has been selected, even in a darkened room, provided that the light selector 20 has been operated.

Figure 9:
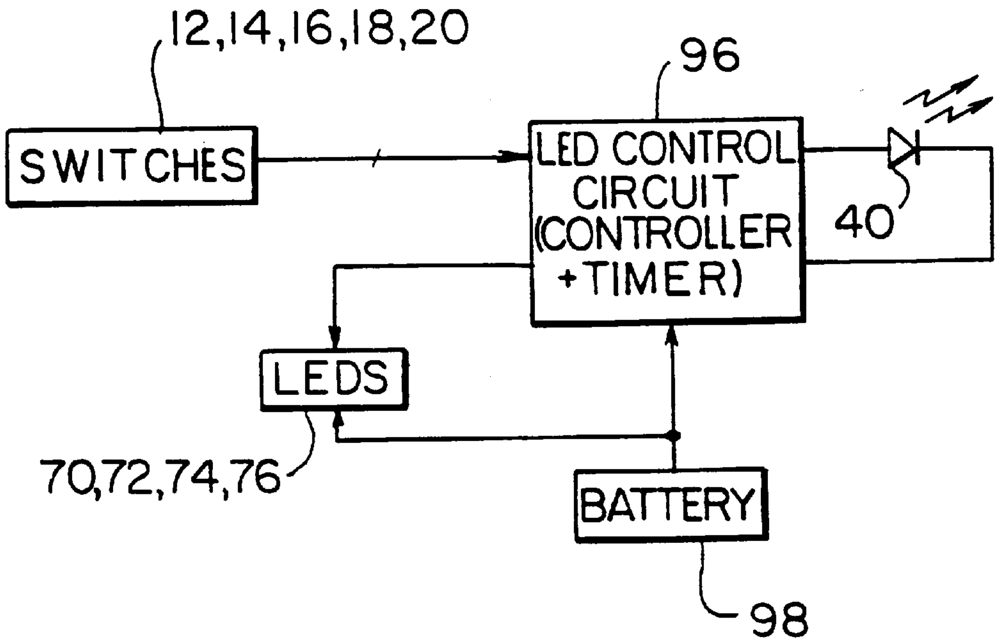
FIG. 9 is an schematic in block diagram form showing the interconnections of the LED control circuit according to an embodiment of the present invention.

Turning now to FIG. 9, an LED control circuit 96, which includes a controller and a timer circuit, is installed on the PCB 32. The LED control circuit 96, powered by the pair of batteries 98, controls the LEDs 70, 72, 74, 76 and the IR LED 40 in response to the function selector switches 12, 14, 16, 18, 20 as described above.

Thus, it is apparent that in accordance with the present invention an apparatus that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the appended claims.

What is claimed is:

1. A remote control, comprising:

a body;

a plurality of function indicators including a static function indicator made of a semi-transparent material and arranged to protrude through a front panel of the body;

backlighting means for backlighting said plurality of function indicators and said static function indicator, thereby facilitating operation of the remote control in a darkened room and forming a backlighted static function indicator; and a slide switch including an overlapping opaque slide switch member overlapping said backlighted static function indicator, said static function indicator having a plurality of labeled positions corresponding to a plurality of selectable functions, wherein said overlapping opaque slide switch member obscures from view a selected one of said plurality of labeled positions of said backlighted static function indicator.

2. The remote control of claim 1, wherein said semi-transparent material is semitransparent rubber.

3. The remote control of claim 2, wherein said backlighting means includes:

a printed circuit board including a plurality of light-emitting-diodes; and a substantially planar light pipe formed of a transparent material adapted to be mounted on top of said printed circuit board for uniformly distributing the light emitted by said plurality of light emitting diodes.

4. The remote control of claim 3, wherein said plurality of light-emitting-diodes are arranged to protrude from a top surface of said printed circuit board, and wherein a bottom surface of said light pipe includes a plurality of bevelled recesses to receive said plurality of light-emitting-diodes, thereby uniformly distributing the light emitted by said plurality of light emitting diodes.

5. The remote control of claim 3, wherein said transparent material is plastic, thereby allowing said light pipe to be injection molded.

6. The remote control of claim 3, wherein one of said plurality of function indicators functions as a light switch, and wherein said printed circuit board further includes lighting control means responsive to said light switch and to said plurality of function indicators, wherein said lighting control means turns on said plurality of light-emitting-diodes in response to the activation of said light switch, and turns off said plurality of light-emitting-diodes after a predetermined period of time of inactivity of said plurality of function indicators.

7. The remote control of claim 3, wherein said plurality of function indicators is arranged in one flexible layer.

8. A remote control, comprising:

a housing;

a plurality of translucent keys including a static function indicator formed in a flexible layer protruding through said housing;

a printed circuit board including:

a plurality of light-emitting-diodes protruding from a top surface of said printed circuit board, and control means for controlling said plurality of light-emitting-diodes, wherein said control means turns on said plurality of protruding light-emitting-diodes when one of said plurality of translucent keys is activated, and turns off said plurality of protruding light-emitting-diodes after a predetermined period of time of inactivity of said plurality of translucent keys;

a substantially planar and transparent light pipe including a plurality of bevelled recesses formed in a bottom surface thereof to receive said plurality of protruding light-emitting-diodes, wherein said light pipe is sandwiched between said plurality of translucent keys and said printed circuit board, thereby backlighting said flexible layer; and a slide switch including an overlapping opaque slide switch member overlapping said static function indicator, said static function indicator having plurality of labeled positions corresponding to a plurality of selectable functions, wherein said overlapping opaque slide switch member obscures from view a selected one of said plurality of labeled positions of said static function indicator.

9. The remote control of claim 8, wherein said light pipe is made of transparent plastic.

10. The remote control of claim 8, wherein said housing includes:

a base section including a flat surface located at one end;

a top section located at the other end; and a battery compartment located in the base section, wherein said base section is larger than said top section, thereby lowering the center of gravity of the housing and permitting said housing to stand firmly when said flat surface of said base section is placed on another flat surface such as a table.

* * * * *